(12) United States Patent
Kushido et al.

(10) Patent No.: US 10,511,812 B2
(45) Date of Patent: Dec. 17, 2019

(54) INFORMATION DISPLAYING SYSTEM AND INFORMATION PROVIDING TERMINAL

(71) Applicant: Panasonic Intellectual Property Management Co., Ltd., Osaka (JP)

(72) Inventors: Yohei Kushido, Kanagawa (JP); Kazuyuki Horio, Tokyo (JP); Ryuuichi Yatsunami, Fukuoka (JP); Yuji Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/080,403

(22) PCT Filed: Mar. 9, 2017

(86) PCT No.: PCT/JP2017/009412
§ 371 (c)(1),
(2) Date: Aug. 28, 2018

(87) PCT Pub. No.: WO2017/163897
PCT Pub. Date: Sep. 28, 2017

(65) Prior Publication Data
US 2019/0098258 A1 Mar. 28, 2019

(30) Foreign Application Priority Data
Mar. 25, 2016 (JP) .................. 2016-062799

(51) Int. Cl.
*H04N 7/14* (2006.01)
*H04N 7/18* (2006.01)
(Continued)

(52) U.S. Cl.
CPC ......... *H04N 7/181* (2013.01); *H04N 5/23203* (2013.01); *H04N 5/247* (2013.01)

(58) Field of Classification Search
CPC .... H04N 7/181; H04N 5/23203; H04N 5/247; H04N 7/142; H04N 7/147;
(Continued)

(56) References Cited

U.S. PATENT DOCUMENTS 5,239,373 A * 8/1993 Tang .................. H04N 1/00283
348/14.01
6,069,648 A 5/2000 Suso et al.
(Continued)

FOREIGN PATENT DOCUMENTS

JP 11-69214 3/1999
JP 2000-134594 5/2000
(Continued)

OTHER PUBLICATIONS

International Search Report dated May 23, 2017 in International (PCT) Application No. PCT/JP2017/009412.
(Continued)

*Primary Examiner* — Howard D Brown, Jr.
(74) *Attorney, Agent, or Firm* — Wenderoth, Lind & Ponack, L.L.P.

(57) ABSTRACT

In an information providing terminal, a display switching controller instructs to switch between pieces of display content of a third display panel from an image of a face of a user captured by a first camera to an image captured by any one of a second camera, a third camera, and a fourth camera. The display switching controller instructs to switch between pieces of display content of a fourth display panel from an image of hands of the user captured by the second camera to an image which is captured by any one of the first camera, the third camera, and the fourth camera.

5 Claims, 13 Drawing Sheets

(51) Int. Cl.
*H04N 5/232* (2006.01)
*H04N 5/247* (2006.01)

(58) Field of Classification Search
CPC .............. H04N 1/00281; G06F 1/1605; G06F 3/04883; G06F 21/31; G06K 7/1095; G06K 7/1417; G06Q 30/0601
See application file for complete search history.

(56) References Cited

U.S. PATENT DOCUMENTS

| | | | |
|---|---|---|---|
| 6,215,781 B1 * | 4/2001 | Kato | H04N 5/268 348/705 |
| 2001/0004269 A1 | 6/2001 | Shibata et al. | |
| 2008/0231544 A1 | 9/2008 | Cooper et al. | |
| 2011/0074915 A1 * | 3/2011 | Ferren | H04N 7/142 348/14.11 |
| 2014/0285614 A1 * | 9/2014 | Epstein | H04N 5/268 348/14.07 |

FOREIGN PATENT DOCUMENTS

| | | |
|---|---|---|
| JP | 2001-169166 | 6/2001 |
| JP | 2004-056207 | 2/2004 |
| JP | 2004-147105 | 5/2004 |

OTHER PUBLICATIONS

Extended European Search Report dated Feb. 21, 2019 in related European Patent Application No. 17769942.8.

* cited by examiner

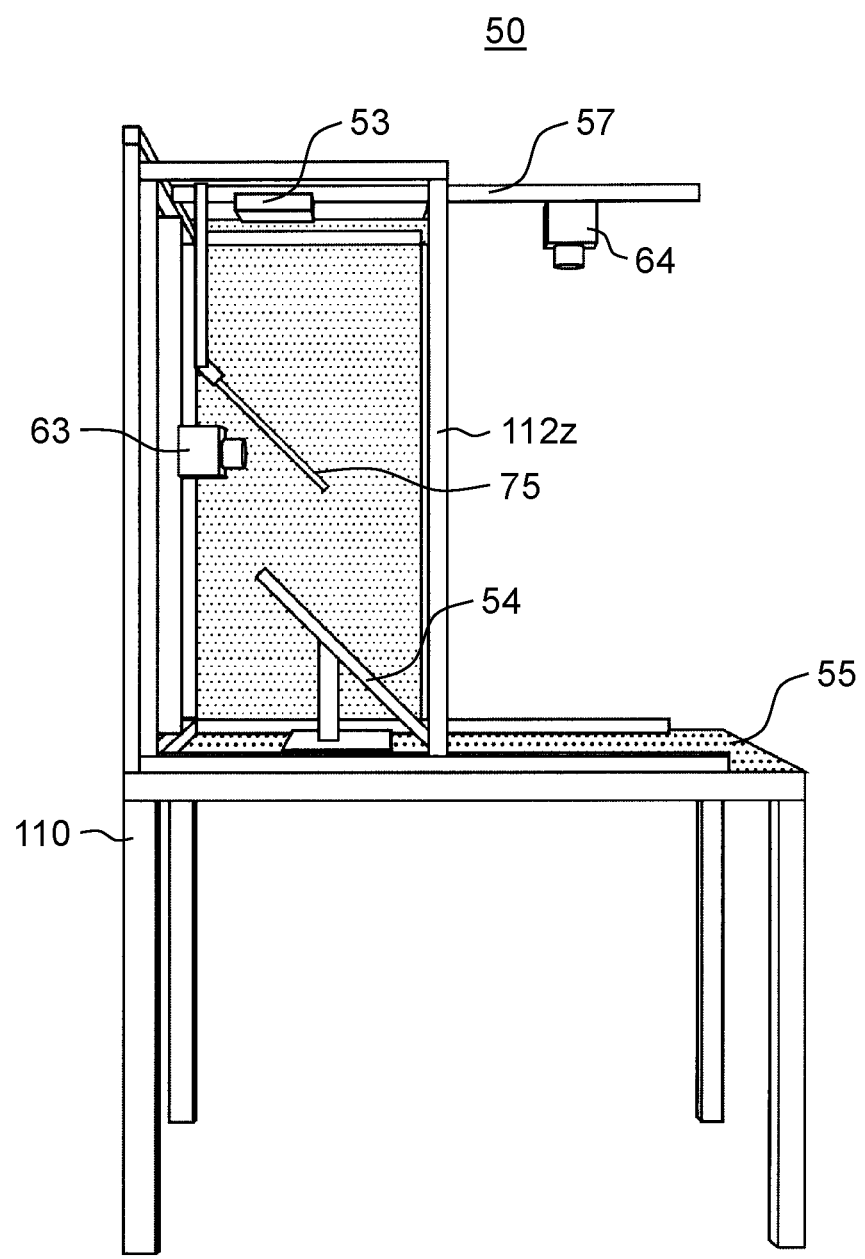

FIG. 7A
FIG. 7B
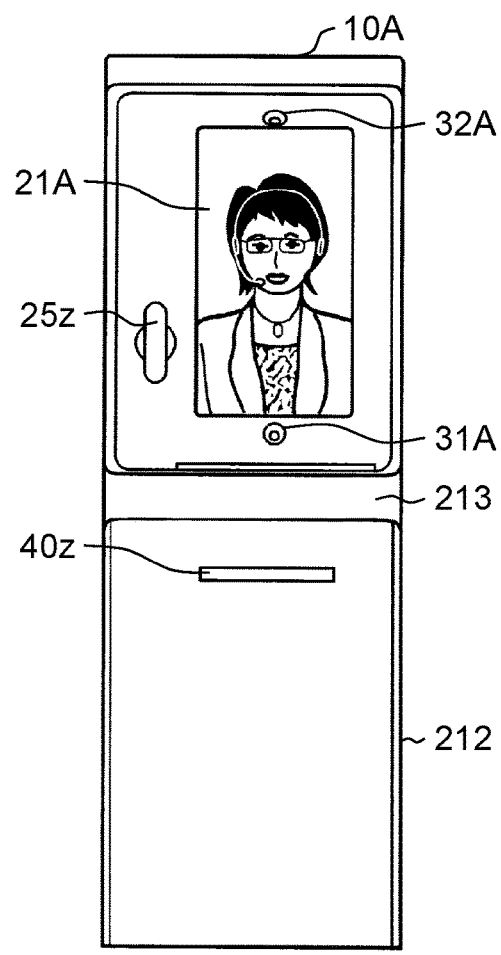
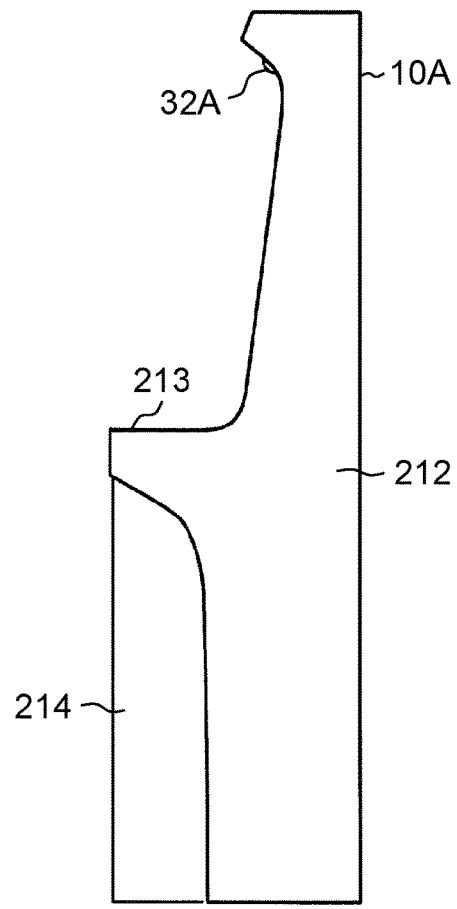

FIG. 8A
FIG. 8B
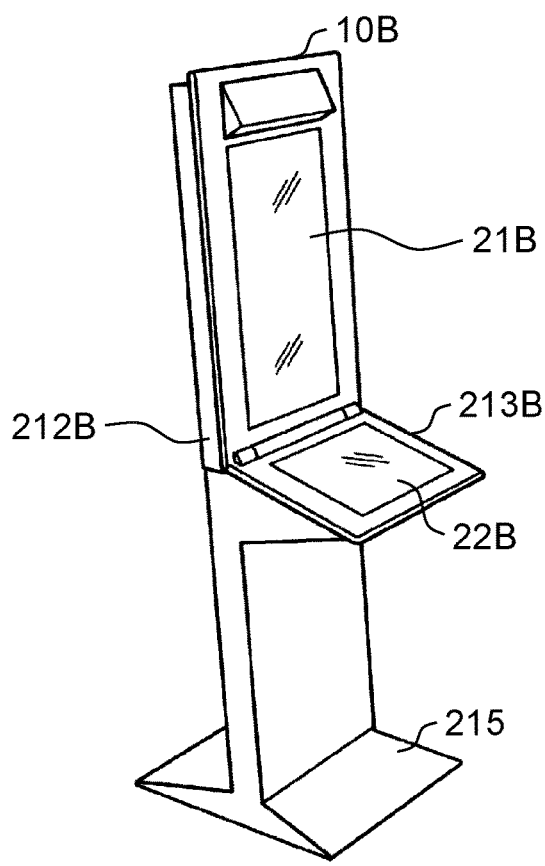
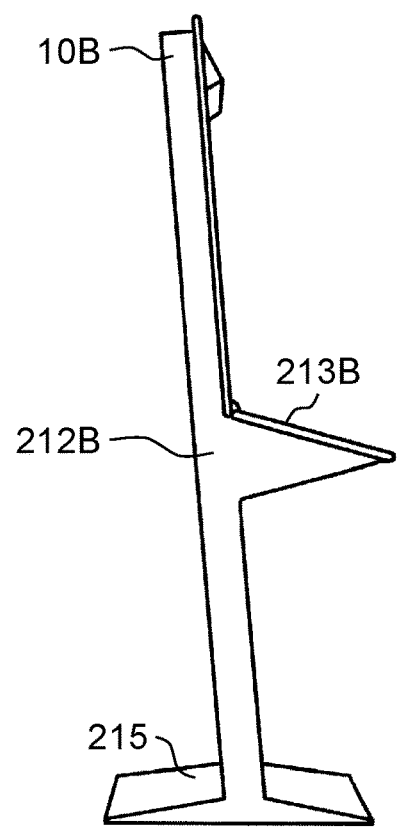

FIG. 9A
FIG. 9B
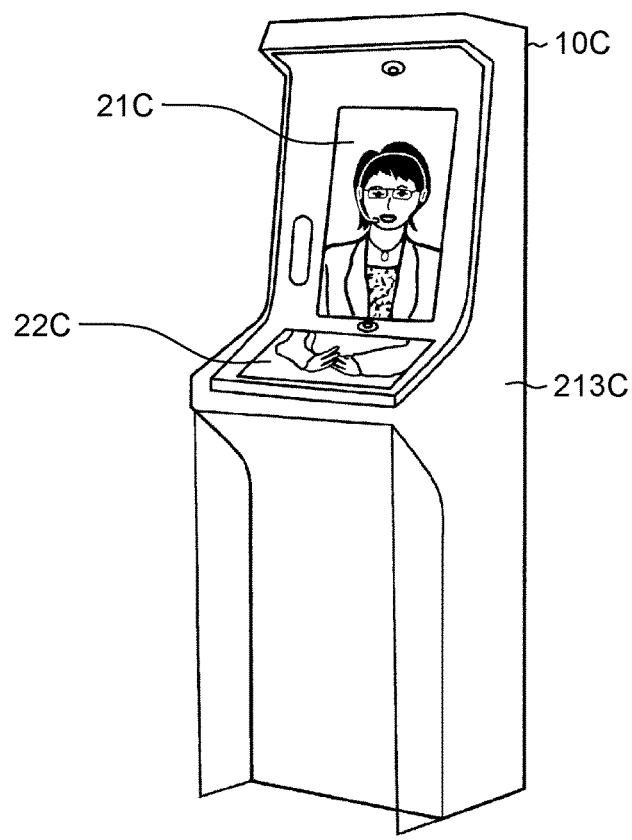
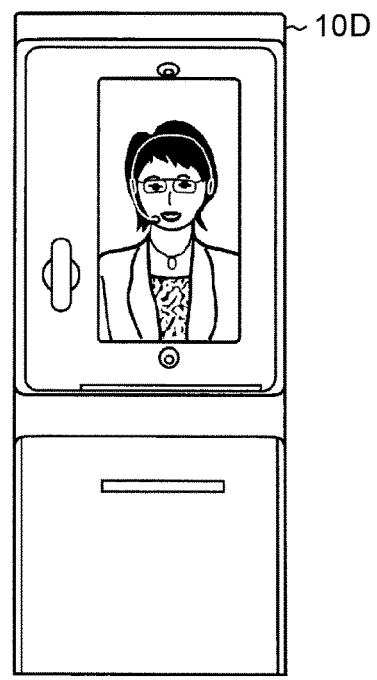

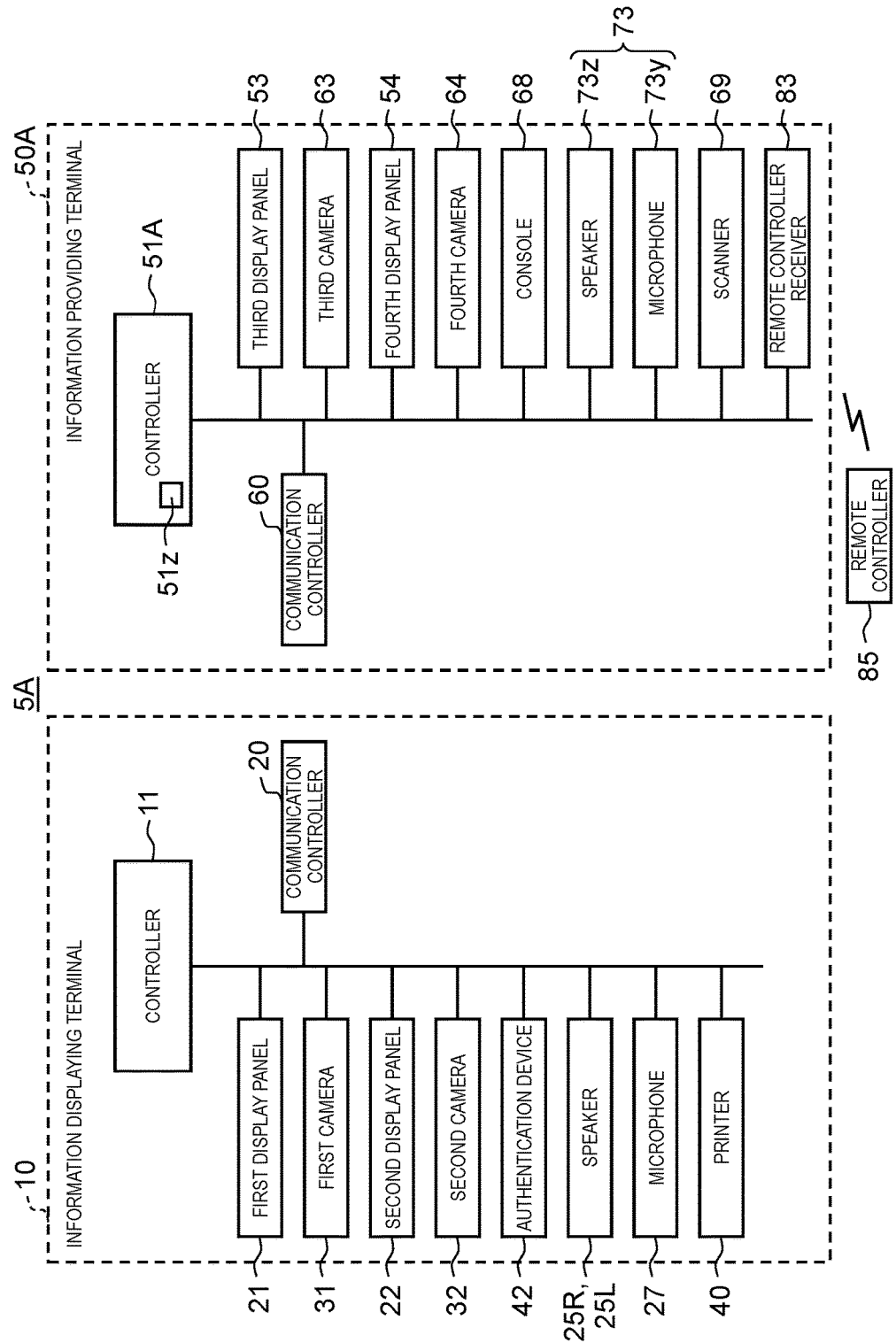

INFORMATION DISPLAYING SYSTEM AND INFORMATION PROVIDING TERMINAL

TECHNICAL FIELD

The present disclosure relates to an information displaying system and an information providing terminal which display information.

BACKGROUND ART

A multimedia terminal (for example, refer to PTL 1) has been known which performs communication with a terminal used by an operator who is a communication partner existing in a separated location, and enables a user to exchange various pieces of information with a feeling of facing the operator.

The multimedia terminal disclosed in PTL 1 includes cameras and three displays, images a face and hands of the user using the cameras, and transmits imaged pictures to the terminal used by the operator. In addition, among the three displays, the multimedia terminal causes a first display to display the face of the user, causes a second display to display multimedia information, such as text, still images, and moving images, and causes a third display to display a touch panel and an input panel on which it is possible to input characters, symbols, and the like. Furthermore, the multimedia terminal includes a microphone and a speaker in order to make a call with the terminal used by the operator.

However, in a case where only a facial picture of the operator is displayed on a display of a multimedia terminal used by the user in communication between the multimedia terminal used by the user and the terminal used by the operator, it is not sufficient to supply the sense of realism in which the user actually performs exchange with the operator.

Furthermore, in order to make the user to brim with the sense of realism, it is necessary to accurately and rapidly send information to the user, and it is desired to improve usability for the operator by installing a camera which images a face and hands of the operator and an operator-side monitor on which the face and the hands of the user are displayed.

An object of the present disclosure is to provide the sense of realism that the user actually faces a communication partner, and to improve the usability for the operator in a case of using the camera which images the face and the hands of the operator and the operator-side monitor on which the face and the hands of the user are displayed.

CITATION LIST

Patent Literature

PTL 1: Japanese Patent Unexamined Publication No. 2004-147105

SUMMARY OF THE INVENTION

According to the present disclosure, there is provided an information displaying system, in which an information displaying terminal that can be operated by a user is connected to an information providing terminal that can be operated by an operator such that communication is possible, in which the information displaying terminal includes a first camera that captures an image of a face of the user; a second camera that captures an image of hands of the user; a first communicator that transmits the image of the face of the user and the image of the hands of the user to the information providing terminal, and that receives an image of a face and at least a part of an upper body of the operator and an image of hands of the operator which are transmitted from the information providing terminal; a first display panel that displays the image of the face and at least the part of the upper body of the operator; and a second display panel that displays the image of the hands of the operator, and in which the information providing terminal includes a third camera that images the face and at least the part of the upper body of the operator; a fourth camera that images the hands of the operator; a second communicator that transmits the image of the face and at least the part of the upper body of the operator and the image of the hands of the operator to the information displaying terminal, and receives the image of the face of the user and the image of the hands of the user which are transmitted from the information displaying terminal; a third display panel that displays the image of the face of the user; a fourth display panel that displays the image of the hands of the user; and a switching processor that instructs to switch between pieces of display content of the third display panel from the image of the face of the user captured by the first camera to the image captured by any one of the second camera, the third camera, and the fourth camera.

In addition, according to the present disclosure, there is provided an information providing terminal, which is connected to information displaying terminal that can be operated by a user such that communication is possible and which can be operated by an operator, the information providing terminal including: a first camera that images a face and at least a part of an upper body of the operator; a second camera that images hands of the operator; a communicator that transmits an image of the face and at least the part of the upper body of the operator and an image of the hands of the operator to the information displaying terminal, and receives an image of a face of the user and an image of hands of the user which are transmitted from the information displaying terminal; a first display panel that displays the image of the face of the user; a second display panel that displays the image of the hands of the user; and a switching processor that instructs to switch between pieces of display content of the first display panel from the image of the face of the user captured by the first camera to any one of the image of the hands of the user, the image captured by the first camera, and the image captured by the second camera.

According to the present disclosure, it is possible to provide the sense of realism that the user actually faces a communication partner and to improve usability for the operator in a case of using the camera which images the face and the hands of the operator and an operator-side monitor on which the face and the hands of the user are displayed.

BRIEF DESCRIPTION OF DRAWINGS

FIG. 5 is a diagram illustrating an inside of the information providing terminal in the state, in which the top plate and the side plate on one side are detached, viewed from a lateral side.

FIG. 7A is an appearance diagram illustrating an information displaying terminal, which is viewed from a front direction, according to a first modification example.

FIG. 7B is an appearance diagram illustrating the information displaying terminal, which is viewed from a lateral direction, according to the first modification example.

FIG. 8A is a perspective diagram illustrating an appearance of an information displaying terminal according to a second modification example.

FIG. 8B is a diagram illustrating the information displaying terminal, which is viewed from the lateral side, according to the second modification example.

FIG. 9A is a perspective diagram illustrating an appearance of an information displaying terminal having a normal size according to a third modification example.

FIG. 9B is an appearance diagram illustrating an information displaying terminal having a small size according to the third modification example in the front direction.

FIG. 10 is a block diagram illustrating an example of inside configurations of an information displaying terminal and an information providing terminal according to a second exemplary embodiment.

DESCRIPTION OF EMBODIMENTS

Details of First Exemplary Embodiment

In a case where a configuration of a system, in which a user and an operator who are in separated locations make a call (conversation), is reviewed, the following defects exist if a camera which images a face of the operator and an operator-side monitor, on which a picture of a face of the user is displayed, are separated and disposed on a side of the operator. That is, in a case where the operator talks with the user while viewing the monitor, the camera images the face of the operator from an angle which is different from an angle at which the operator views the monitor. In this case, the face of the operator is projected onto a monitor, which is provided on a side of the user (that is, a monitor on which a picture of the face of the operator is displayed), such that the operator views a separate direction from a direction in which the operator views the user. Accordingly, it is not possible for the user to perform natural communication, in which the user talks with the operator with a gaze that faces the same direction, and thus unnatural talk is made.

In contrast, in a case where an operator-side terminal is disposed in order to enable the natural communication between the user and the operator, it is not simple to dispose the camera to be close to a place where the monitor is installed rather than expected. Therefore, according to the disposition of the camera, useless empty space is generated due to a relation with a location where the monitor is installed, and thus it is difficult to save space.

Here, in a first exemplary embodiment, an information displaying system and an information providing terminal which save a space of an installment device in disposition of the operator-side terminal and which are capable of performing communication with the user with natural gaze will be described.

Hereinafter, exemplary embodiments of the information displaying system and the information providing terminal according to the present disclosure will be described with reference to the accompanying drawings. However, there is a case where unnecessarily detailed description is omitted. For example, there is a case where detailed description of already well-known matters or repeated description of substantially the same configuration is omitted. The reason for this is to avoid description below being unnecessarily redundant for easy understanding of those skilled in the art. Meanwhile, the accompanying drawings and the description below are provided such that those skilled in the art sufficiently understand the present disclosure, and it is not intended to limit subjects disclosed in claims.

Information displaying systems according to the respective exemplary embodiments below are applied to systems in which a user who is, for example, a customer entered in a facility communicates with an operator who is waiting at an operation center at a distance and it is possible to receive various pieces of guidance from the operator.

First Exemplary Embodiment

Figure 1:
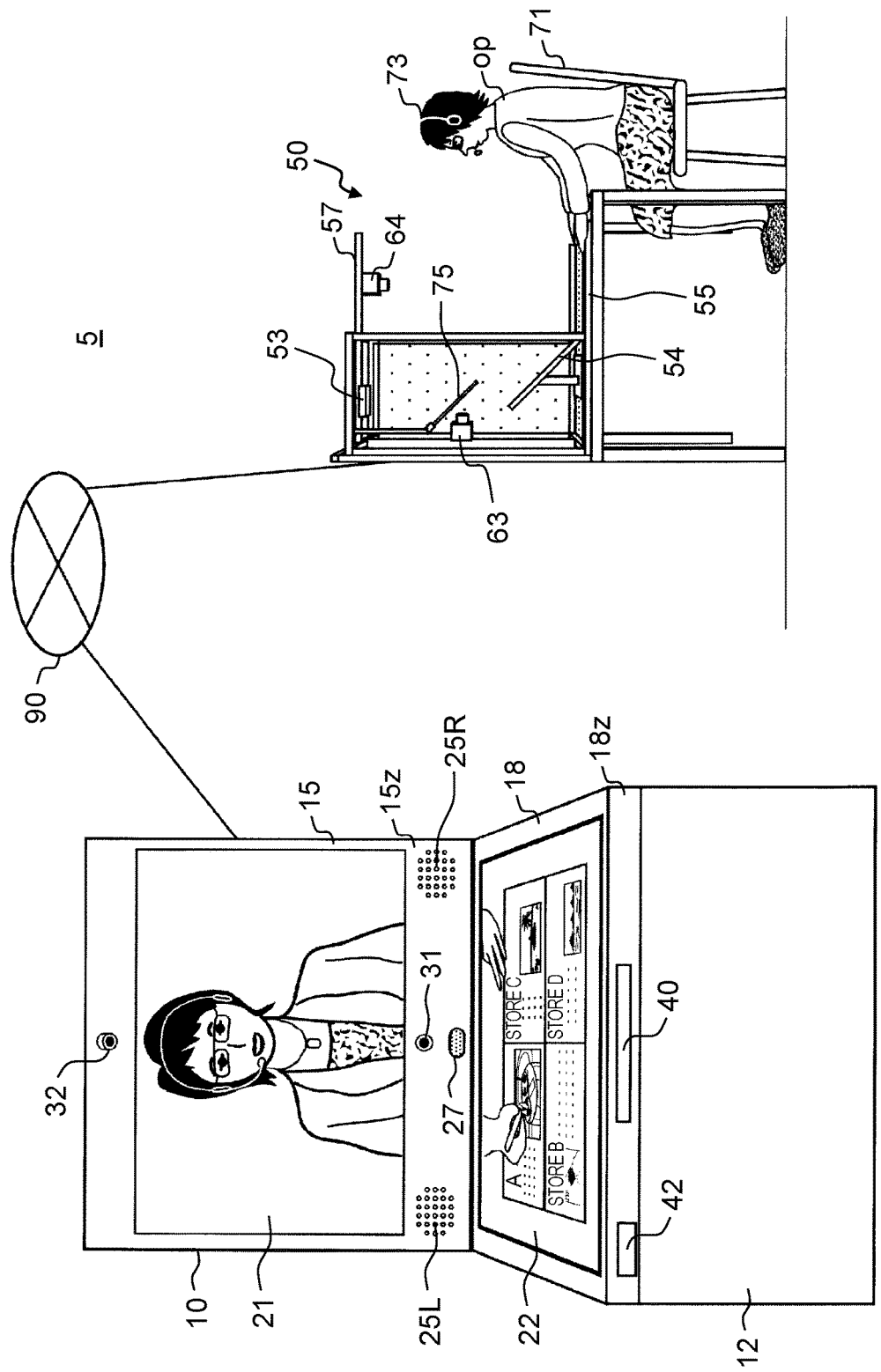
FIG. 1 is a diagram illustrating an example of a schematic configuration of an information displaying system according to a first exemplary embodiment.

FIG. 1 is a diagram illustrating an example of a schematic configuration of information displaying system 5 according to a first exemplary embodiment. Information displaying system 5 includes user-side information displaying terminal 10 and operator-side information providing terminal 50, which are connected to each other through network 90. Information displaying terminal 10 and information providing terminal 50 are capable of communicating various data (text data, picture data, sound data, and the like) with each other through network 90.

A wired Local Area Network (LAN), which is connected to a wide area communication network, such as the Internet, a wireless LAN, a dedicated line, or the like is used for network 90. In addition, both information displaying terminal 10 and information providing terminal 50 are capable of accessing various server devices (not illustrated in the drawing) which are connected to network 90.

Information displaying terminal 10 is loaded on box-shaped stand 12 having a certain height to be adjusted to a height of a person. Stand 12 is integrated with information displaying terminal 10 by, for example, being coated with the same color as a housing of information displaying terminal 10 or being covered by a cover which is common to information displaying terminal 10. Information displaying terminal 10 includes first housing 15 that is provided to protrude upwards so as to face a face of the user, and a second housing 18 that is extended to a front side such that hands of the user (that is, the span of the hands, which includes some parts of hands, arms, palms, nails, and the like. The same as above) can be in contact with.

On a front surface of first housing 15, first display panel 21 is provided onto which an image of a face and at least a part of an upper body of an operator captured by third camera 63, which will be described later, is projected. On first display panel 21, the image of the face and at least the part of the upper body of the operator is displayed in a size which is approximately the same as an actual size. Therefore, it is possible for the user to acquire a sense of realism that the user actually faces the operator. In addition, an upper front surface of first housing 15 is provided with second camera 32 that images vicinity of the hands of the user. A lower front surface of first housing 15, that is, middle part 15z of the housing, in which first display panel 21 and second display panel 22 are disposed, becomes an area in which the display panel is not disposed. Middle part 15z is provided with first camera 31 that captures the image of the face and at least the part of the upper body of the user. In addition, in the vicinity of the both ends of middle part 15z, a left-and-right pair of speakers 25L and 25R (an example of an output device) that output sound data emitted by the operator are provided. In the vicinity of a center of middle part 15z, microphone 27 (an example of an input device) that absorbs sound emitted by the user is provided. In a case where the output device and the input device are disposed in middle part 15z of the housing, in which first display panel 21 and second display panel 22 are disposed, the operator is naturally projected onto first display panel 21, and thus increase in the sense of realism is further expected.

In contrast, an upper surface of second housing 18 is provided with second display panel 22 onto which an image of the vicinity of hands of the operator captured by fourth camera 64, which will be described later, and a User Interface (UI) screen, and the like are projected. Second display panel 22 may include a display device that only displays a picture, or may include a touch panel on which a touch input operation is possible. In a case where second display panel 22 includes the touch panel, information acquired through touch input is transmitted, from information displaying terminal 10 to information providing terminal 50 or various server devices which are connected to network 90. Here, the case where second display panel 22 includes the touch panel will be illustrated.

In addition, front end surface 18z of second housing 18 is disposed with an exhaust slot of printer 40 that is capable of performing hard copy of the screen which is displayed on second display panel 22. A main body of printer 40 is embedded in stand 12. In addition, front end surface 18z of second housing 18 is installed with reading device 42 that reads authentication information (for example, various pieces of information relevant to a card, which are requested in a case where a card settlement process is performed, and a password number such as Personal Identification Number (PIN)) used to perform personal authentication of the user.

In contrast, information providing terminal 50 includes operational desk 110. A structure of information providing terminal 50, which includes operational desk 110, will be described in detail later with reference to FIG. 3 to FIG. 5. Therefore, the structure will be simply described here. Meanwhile, FIG. 1 illustrates a state in which side plate 112x (refer to FIG. 3) is detached and an inside is viewed in explanation.

In front of operational desk 110, operator op with headset 73 is sitting on chair 71 in a posture that is easy to perform guidance. Headset 73 is connected to information providing terminal 50, outputs sound emitted by the user, and absorbs sound emitted by the operator.

U-shaped or portal support stand 112 is fixed to an operational surface of operational desk 110. Support stand 112 supports electronic components which will be described later. Third display panel 53, onto which the image of the face and at least a part of the upper body of the user captured by first camera 31 is projected, and third camera 63, which captures the image of a face and at least the part of the upper body of operator op, are supported by support stand 112.

In addition, fourth display panel 54 that displays the image of the hands of the user captured by second camera 32 is disposed to be inclined on the operational surface of operational desk 110 such that it becomes easy for the operator to visually recognize fourth display panel 54. A screen size of fourth display panel 54 is larger than that of third display panel 53, and is configured such that it becomes easy for operator op to visually recognize the hands of the user. Fourth display panel 54 may include a display device that only displays a picture, and may include the touch panel on which the touch input operation is possible. In a case where fourth display panel 54 includes the touch panel, information acquired through the touch input is transmitted from information providing terminal 50 to information displaying terminal 10 and various server devices which are connected to network 90. Here, the case where fourth display panel 54 includes the touch panel will be illustrated.

In addition, in a middle of bar 57 which extends on a side of the operator from support stand 112, fourth camera 64 is provided which images the operational surface of operational desk 110 including the hands of operator op. Fourth camera 64 is capable of imaging the hands of operator op and is capable of imaging a resource, such as a guide pamphlet, which is loaded on operational desk 110. In addition, information providing terminal 50 is capable of capturing a Web site, a UI screen, and the like, which are displayed on fourth display panel 54, as the picture imaged by fourth camera 64. In addition, console 68, such as a keyboard or a mouse, and scanner 69 can be loaded on desk 55.

As described above, user-side information displaying terminal 10 displays the image of the face and at least the part of the upper body of operator op on first display panel 21 based on the picture data received from information providing terminal 50, and displays the image of the hands of operator op, the UI screen, and the like on second display panel 22. Meanwhile, in a case where operator op loads the resource, such as the pamphlet, on the surface of desk 55, second display panel 22 displays the resource as well. In addition, information displaying terminal 10 outputs the sound data, which is received from information providing terminal 50, from speakers 25L and 25R, and transmits the sound data, which is absorbed by microphone 27, to information providing terminal 50.

In contrast, operator-side information providing terminal 50 displays the image of the face and at least the part of the upper body of the user on third display panel 53 based on the picture data, which is received from information displaying terminal 10, and displays the image of the hands of the user or the like on fourth display panel 54. In addition, information providing terminal 50 outputs the sound data, which is received from information displaying terminal 10, from speaker 73z of headset 73, and transmits the sound data, which is absorbed by microphone 73y of headset 73, to information displaying terminal 10.

Here, a displayable area of third display panel 53 according to the first exemplary embodiment may be smaller than a displayable area of fourth display panel 54 which displays the image of the hands of the user or the like. The reason for this is as follows. An important thing for the operator is that operator op shares a spot, which is directed by the user, in a size similar to the user with respect to second display panel 22 which displays information (for example, the pamphlet, a map, or the like) around the hands of operator op imaged by fourth camera 64 for the user. A certain size is necessary for the displayable area of fourth display panel 54 which displays the image of the hands of the user or the like. Furthermore, it is desired that a resolution and the number of pixels of fourth display panel 54 are similar to those of user-side second display panel 22. However, fourth display panel 54 may be a general-purpose monitor. In contrast, third display panel 53, which displays the face of the user (or the face and at least the part of the upper body), may be provided to the extent that operator op understands an expression of the user and a situation of background, and thus the displayable area may not be large, and a high resolution and a large number of pixels are not necessary.

Therefore, the displayable area of third display panel 53 may be smaller than the displayable area of fourth display panel 54 which displays the image of the hands of the user or the like, and the resolution and the number of pixels of third display panel 53 may be smaller than the resolution and the number of pixels of fourth display panel 54. Third display panel 53 may be a general-purpose monitor. By this, it is possible to form a system of operator op-side information providing terminal 50 using a general-purpose monitor, an information processing device (a Personal Computer (PC), a tablet terminal, or the like), or a television receiver. That is, it is possible to form operator op-side information providing terminal 50 with a simple configuration rather than user-side information displaying terminal 10, and to realize natural and smooth communication between the user and operator op. Furthermore, in a case where the system of operator op-side information providing terminal 50 is formed using the general-purpose monitor and the device, degrees of freedom are provided to layouts of the respective monitor and device, and thus it is possible to normally dispose the respective monitor and device in optimal positions with respect to different operators.

Figure 2:
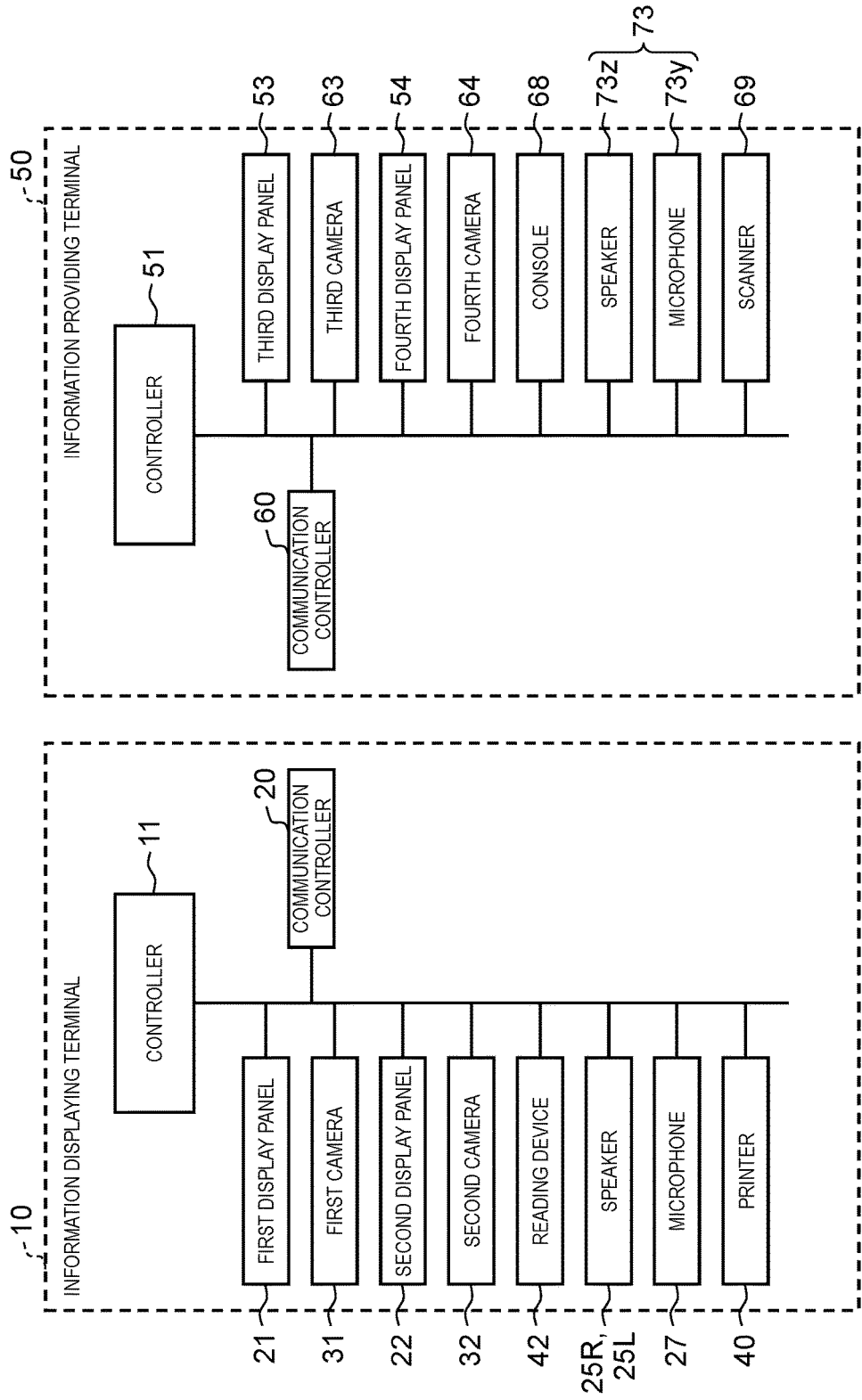
FIG. 2 is a block diagram illustrating an example of inside configurations of an information displaying terminal and an information providing terminal according to the first exemplary embodiment in detail.

FIG. 2 is a block diagram illustrating an example of inside configurations of information displaying terminal 10 and information providing terminal 50 according to the first exemplary embodiment in detail. Information displaying terminal 10 includes controller 11 that integrally controls respective units. In addition to the above-described first display panel 21, first camera 31, second display panel 22, second camera 32, reading device 42, right and left speakers 25L and 25R, microphone 27, and printer 40, communication controller 20 is connected to controller 11.

First display panel 21 includes an ultrahigh-resolution 4K (that is, 3840 pixels×2160 pixels) display that displays a part of the face and the upper body of the operator op. Meanwhile, first display panel 21 may include a touch panel on which the touch input of the user is possible.

First camera 31 is an embedded camera disposed at a bottom of first housing 15, and captures the image of the face and at least the part of the upper body of the user who stands in front of information displaying terminal 10. Meanwhile, an angle of view of first camera 31 may be operated by remote control from operator-side information providing terminal 50. A high-resolution full high vision camera, a high vision camera, or a normal camera is used as first camera 31.

Second display panel 22 includes a touch panel which has the 4K display as an interactive display panel, displays the image of the hands of operator op, an operation menu screen, an application screen, a web site, various documents, or the like, and receives button pressing through a touch operation, write input, and the like. In addition, second display panel 22 receives an instruction to enlarge or reduce screen display through an input operation using fingers of the user or a stylus pen.

Second camera 32 is an embedded camera which is disposed at an upper part of first housing 15. The angle of view is fixed around second display panel 22, and second camera 32 captures an image of the hands of the user or the like who operates second display panel 22. It is desired that second camera 32 is a high-resolution camera of 4K or full-high vision. Furthermore, in a case where second camera 32 is a PTZ camera and a desired location is zoomed in, it is possible to perform imaging such that details are visually recognized.

Speakers 25L and 25R are directional stereo speakers in which the user who is in front of information displaying terminal 10 easily hears, and output sound or the like emitted by operator op. Microphone 27 is a directional microphone which has an orientation direction with respect to the user, and absorbs sound emitted by the user. Meanwhile, microphone 27 and speakers 25L and 25R may be formed as a headset. In a case where the user operates information displaying terminal 10, the user wears the headset on the head.

Printer 40 is capable of printing a screen of second display panel 22 as hard copy, and performing any one of monochrome printing and color printing. In addition, as a printing method, an inkjet method, a laser printing method, an electrostatic recording method, or the like is used.

Communication controller 20 as an example of a first communicator is a network I/F that performs secure communication through communication controller 60 of information providing terminal 50 and network 90. Specifically, communication controller 20 transmits data which includes the image of the face of the user captured by first camera 31 and the image of the hands of the user captured by second camera 32, to information providing terminal 50. In addition, communication controller 20 receives an image of a face and at least a part of an upper body of the operator and an image of hands of the operator which are transmitted from information providing terminal 50.

Reading device 42 reads personal information of the user. For example, a contactless reading and writing device, which reads information of an IC tag through a contactless short distance communication, such as Near Field Communication (NFC), or an IC card reading and writing device, which reads information of an IC card that is inserted into a slot, is provided as reading device 42. Meanwhile, a biometric authentication device, which performs personal authentication using a pattern such as a fingerprint or a vein, may be used. In addition, the personal information of the user, which is read by reading device 42, may be used as the authentication information for a settlement process or electronic money. In a case where the personal authentication is performed, it is possible to enhance convenience and to exclude a forgery or the like.

Meanwhile, information displaying terminal 10 is a multilingual terminal. In a case where the user selects a language which is previously displayed on second display panel 22, information displaying terminal 10 automatically translates sound emitted by operator op into a selected language and outputs the translated sound through speakers 25L and 25R. In addition, information displaying terminal 10 has a function of displaying the sound emitted by the operator using text, an OCR function of recognizing handwritten input characters, and the like.

In contrast, information providing terminal 50 includes controller 51 that integrally controls respective units. In addition to the above-described third display panel 53, third camera 63, fourth display panel 54, fourth camera 64, console 68, speaker 73z of headset 73, microphone 73y, and scanner 69, communication controller 60 is connected to controller 51.

Third display panel 53 has a display which displays the image of the face and at least the part of the upper body of the user. Third display panel 53 is not limited to 4K, and may be a normal display, a high vision display, or a full-high vision display. Meanwhile, third display panel 53 may include a touch panel on which the touch input of operator op is possible.

Third camera 63 is a camera that is attached to frame 112Z. Third camera 63 captures the image of the face and at least the part of the upper body of operator op which is displayed on first display panel 21 of information displaying terminal 10, and thus it is desired that third camera 63 is an ultrahigh-resolution 4K camera.

Fourth display panel 54 includes a touch panel which has a 4K display as an interactive display panel, displays the image of the hands of the user, an operation menu screen, an application screen, a web site, various documents, or the like, and receives button pressing through the touch operation, and the like. In addition, fourth display panel 54 receives an instruction to enlarge or reduce screen display through an input operation using fingers of operator op or a stylus pen.

Fourth camera 64 is a camera which is attached to bar 57, and captures the image of the hands of operator op, the pamphlet, and the like which are placed on a surface of desk 55. Fourth camera 64 images the picture of the hands displayed on second display panel 22, and thus it is desired that fourth camera 64 is an ultrahigh-resolution 4K camera. Furthermore, in a case of the PTZ camera, it is possible to perform imaging such that details are visually recognized.

Console 68 is an input device, such as a mouse or a keyboard, which can be operated by operator op. Scanner 69 reads and scans the pamphlet or the like.

Headset 73 is mounted on the head of operator op, and includes a left-and-right pair of microphone 73y and speaker 73z, microphone 73y which absorbs sound emitted by operator op, and speaker 73z which outputs sound or the like emitted by the user. Meanwhile, in addition that the left-and-right pair of speaker and microphone are integrated as the headset, the left-and-right pair of speaker and microphone may include stand-alone housings, respectively.

Communication controller 60 as an example of a second communicator is a network I/F that performs secure communication through communication controller 20 of information displaying terminal 10 and network 90. Specifically, communication controller 60 transmits data, which includes the image of the face and at least the part of the upper body of the operator captured by third camera 63 and an image of the hands of the operator captured by fourth camera 64, to information displaying terminal 10. In addition, communication controller 60 receives the image of the face of the user and the image of the hands of the user which are transmitted from information displaying terminal 10.

Figure 3:
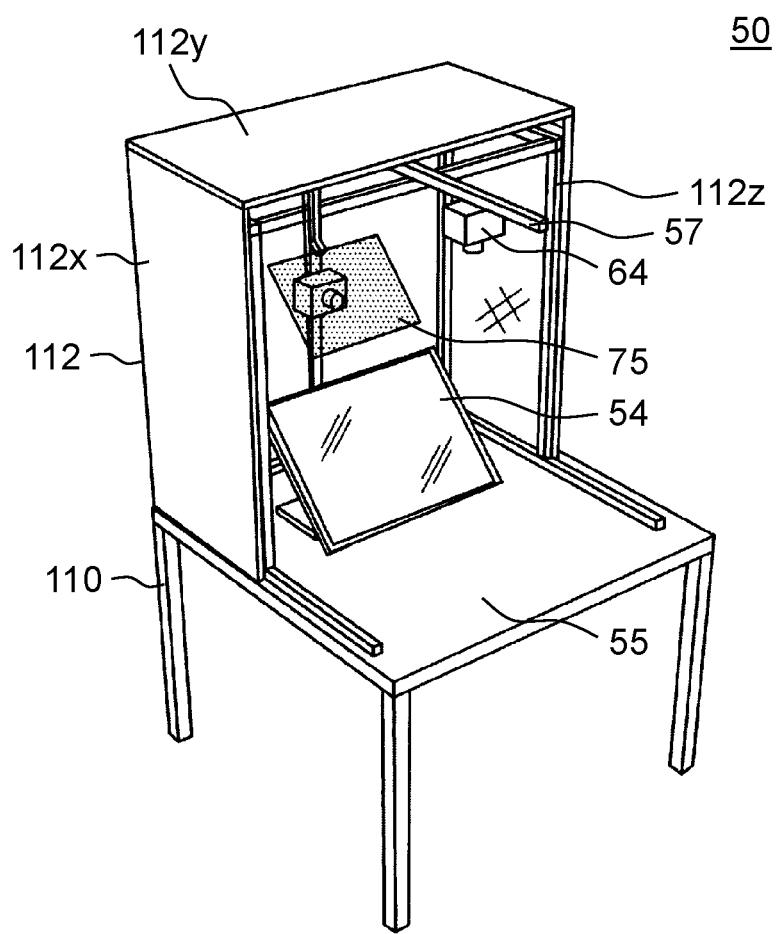
FIG. 3 is a perspective diagram illustrating an example of appearance of the information providing terminal.
Figure 4:
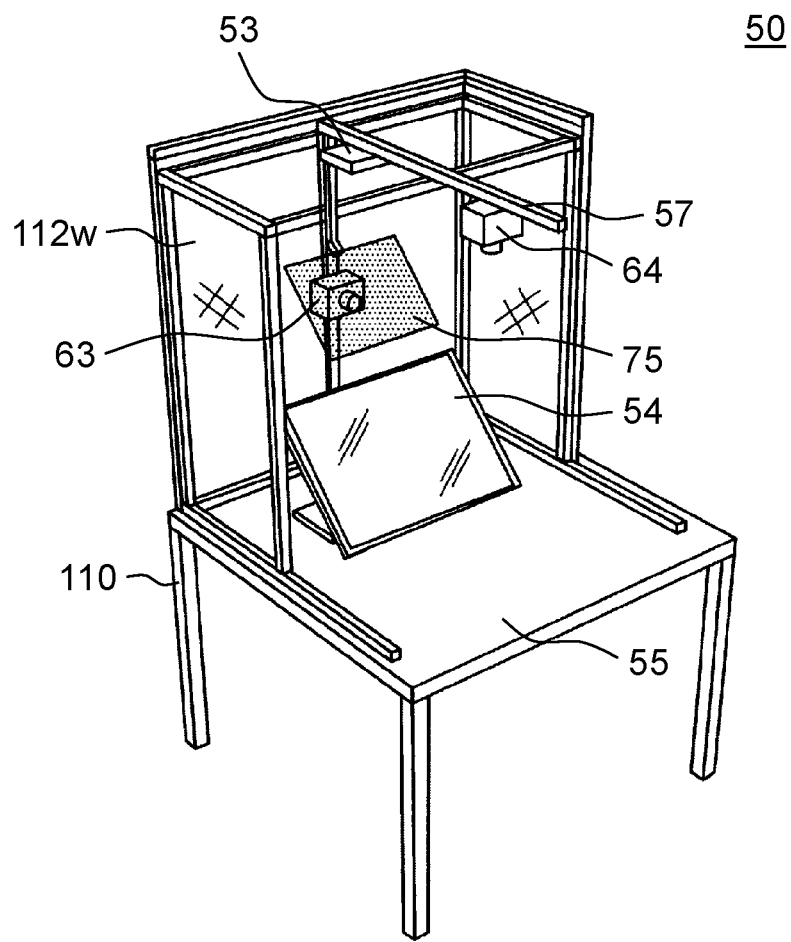
FIG. 4 is a perspective diagram illustrating an example of an inside disposition of the information providing terminal in a state in which a top plate and a side plate on one side are detached.

FIG. 3 is a perspective diagram illustrating an example of appearance of information providing terminal 50. FIG. 4 is a perspective diagram illustrating an example of an inside disposition of information providing terminal 50 in a state in which top plate 112y and side plate 112x on one side are detached. FIG. 5 is a diagram illustrating the inside of the information providing terminal 50, which is viewed from the lateral side, in the state in which top plate 112y and side plate 112x on one side are detached.

As described above, information providing terminal 50 includes operational desk 110 as a principal component, and has a configuration in which third display panel 53, fourth display panel 54, half mirror 75, third camera 63, and fourth camera 64 are disposed on operational desk 110.

Portal support stand 112 is fixed to the operational surface of operational desk 110. Support stand 112 has a structure in which top plate 112y, two pieces of side plates 112x, and rear surface plate 112w are attached to frame 112z which is arranged in an approximately box shape. A surface, which faces the operator, of support stand 112 is open. Meanwhile, in FIG. 4 and FIG. 5, in order to easily understand an inside of support stand 112, one piece of side plate 112x and top plate 112y are detached for convenience.

Fourth display panel 54 is attached to the operational surface of operational desk 110 in a state of being obliquely inclined, for example, by 45° to a rear side (a side opposite to the operator), and thus it becomes easy for the operator to visually recognize fourth display panel 54. For example, switching menu 122, which is capable of switching between pieces of display content to be displayed on fourth display panel 54, is displayed on fourth display panel 54. Fourth display panel 54 includes the touch panel. The user may operate switching menu 122 by directly touching fourth display panel 54 or using a mouse.

In addition, third camera 63, which is capable of imaging the operator, is fixed to frame 112z on a rear surface plate side of support stand 112. In addition, third display panel 53 is fixed to frame 112z on a top plate side of support stand 112. Half mirror 75 is attached to a center of the inside of support stand 112 such that half mirror 75 is supported by obliquely protruded frame 112z.

Half mirror 75, which functions as a reflection section, reflects light attributable to an image, which is projected onto third display panel 53, to the side of the operator, and is attached while being inclined by a prescribed angle (in the exemplary embodiment, for example, 45° with respect to the operational surface) such that incident light from the side of the operator to third camera 63 passes therethrough. In the exemplary embodiment, a function as a prompter system is formed by half mirror 75, third display panel 53, and third camera 63.

Generally, a prompter includes a transparent glass plate which is disposed while being inclined by the prescribed angle with respect to the operator, and causes the operator to visually recognize information, such as characters, in such a way that, for example, the information, such as the characters, displayed on a display (a monitor, a PC, or the like) placed at a lower part is projected onto the transparent glass plate and the transparent glass plate reflects the information, such as the characters, to the side of the operator. In the exemplary embodiment, half mirror 75 is formed of the transparent glass plate.

In addition, two pieces of side plates 112x, top plate 112y, and rear surface plate 112w of support stand 112 function as a hood (cover) which shields external light that is incident on half mirror 75. That is, fourth display panel 54, third display panel 53, and half mirror 75 are covered by top plate 112y, two pieces of side plates 112x, and rear surface plate 112w except front surface, and thus it is possible to shield the external light. Therefore, visibility of the image, which is projected onto fourth display panel 54, third display panel 53, and half mirror 75, is secured.

In addition, in the exemplary embodiment, fourth display panel 54, half mirror 75, and third display panel 53 are disposed such that a center of fourth display panel 54, a center of half mirror 75, and a center of third display panel 53 are located on approximately the same vertical line. In a case where the center of half mirror 75 and the center of third display panel 53 are located on approximately the same vertical line, it is possible for half mirror 75 to face the operator without missing the image projected onto third display panel 53 and without unnecessarily enlarging a size of half mirror 75.

In addition, fourth camera 64 is attached to bar 57, which extends to the side of the operator as a part of frame 112z disposed at the upper part of support stand 112, such that the hands of the operator is easily imaged.

Information providing terminal 50 has a reverse disposition structure in which third display panel 53 is disposed at an upper part of half mirror 75 and third camera 63 is disposed at the back of half mirror 75, and which is different from the disposition of prompter system. In the reverse disposition, half mirror 75 is disposed between third display panel 53 and fourth display panel 54. In contrast, in the prompter, normally, monitor corresponding to the third display panel is disposed at a lower part of the half mirror.

Meanwhile, similar to the normal prompter, information providing terminal 50 may have a normal disposition structure in which third display panel 53 is disposed at a lower part of half mirror 75 and is attached to the back side of fourth display panel 54. In the normal disposition, half mirror 75 is disposed at an upper part of third display panel 53 and fourth display panel 54. In addition, an angle of inclination of half mirror 75 in the normal disposition faces an opposite direction of an angle of inclination of half mirror 75 in the reverse deposition with respect to a horizontal direction, and is an angle in which a reflection surface floats with respect to the side of the operator.

In the normal disposition, third display panel 53 is disposed at the back of fourth display panel 54, and thus a length of support stand 112 in a depth direction becomes long. Therefore, the support stand becomes large, and thus it is difficult to make the support stand compact. In addition, a useless space, which is not used, is generated at an upper part of an inner side of the support stand.

In contrast, in the reverse disposition, it is possible to effectively utilize the upper part of the inner side of support stand 112, to which third display panel 53 is attached, without emptying out as the useless space, compared to the normal disposition. Accordingly, it is possible to reduce the length of support stand 112 in the depth direction and it is possible to make support stand 112 compact.

Meanwhile, in a case where third display panel 53 is attached such that a direction of the image, which is projected onto third display panel 53 in the reverse disposition, faces an opposite direction by 180° from a direction of the image, which is projected onto third display panel 53 in the normal disposition, it is possible to align the directions of the images which are projected onto the side of the operator.

Figure 6A:
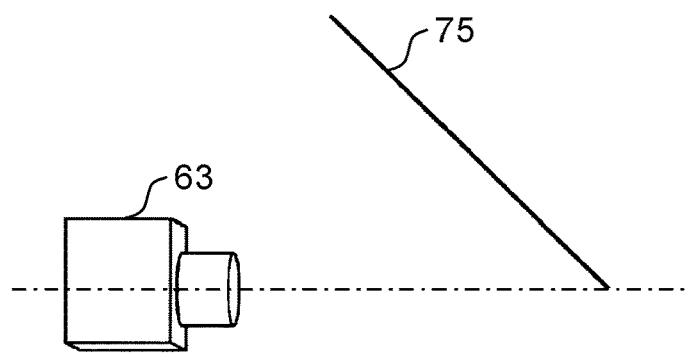
FIG. 6A is a diagram illustrating a positional relation between a half mirror and a third camera.
Figure 6B:
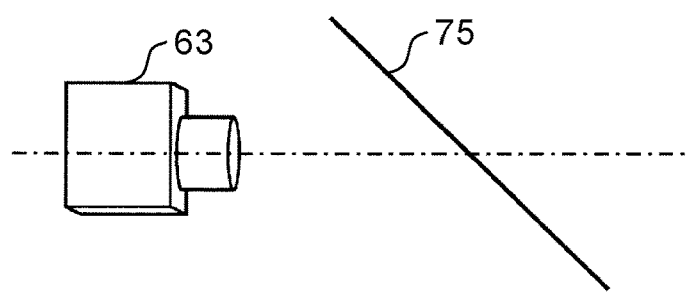
FIG. 6B is a diagram illustrating the positional relation between the half mirror and the third camera.
Figure 6C:
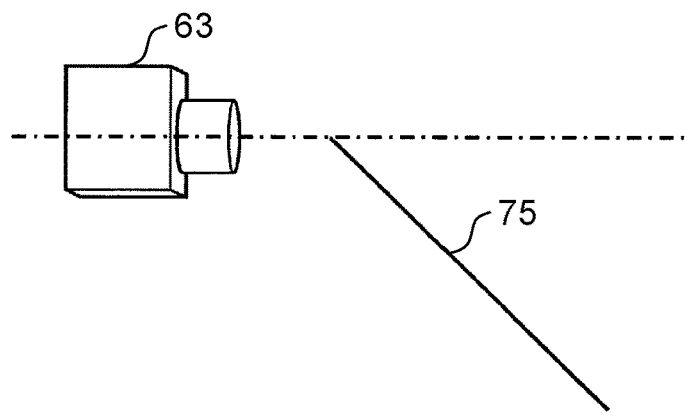
FIG. 6C is a diagram illustrating the positional relation between the half mirror and the third camera.

FIG. 6A, FIG. 6B, and FIG. 6C are diagrams illustrating positional relation between half mirror 75 and third camera 63.

In FIG. 6A, half mirror 75 and third camera 63 are attached such that an optical axis of third camera 63 is located at a lower end of half mirror 75. In a case where an image from third display panel 53 is projected onto the center of half mirror 75, third camera 63 images a facial picture of the operator such that gaze of the operator slightly turns upward. Therefore, it is possible for the user to talk with the operator who is displayed on first display panel 21 and has an expression slightly looking up.

In FIG. 6B, half mirror 75 and third camera 63 are attached such that the optical axis of third camera 63 is located at the center of half mirror 75. In a case where the image from third display panel 53 is projected onto the center of half mirror 75, third camera 63 images the facial picture of the operator such that the gaze of the operator faces the front. Therefore, it is possible for the user to talk with the operator who is displayed on first display panel 21 and has an expression viewed directly forward.

In FIG. 6C, half mirror 75 and third camera 63 are attached such that the optical axis of third camera 63 is located at an upper end of half mirror 75. In a case where the image from third display panel 53 is projected onto the center of half mirror 75, third camera 63 images the facial picture of the operator such that the gaze of the operator faces slightly downward. Therefore, it is possible for the user to talk with the operator who is displayed on first display panel 21 and has an expression slightly looking down.

In information providing terminal 50, which has the above structure, the operator has a conversation with the user while viewing a facial picture of the user projected onto half mirror 75. Third camera 63 disposed at the back of half mirror 75 images the facial picture of the operator from the front over half mirror 75. At this time, the facial picture of the operator, which faces the front, is projected onto first display panel 21 of information displaying terminal 10. Therefore, the user gets an impression in which the operator is talking with the user while making eye contact, and thus it is possible to provide talking which brims with the sense of realism.

In addition, the operator slightly moves gaze to fourth display panel 54 which is located at a lower part of half mirror 75, and operates fourth display panel 54 using a touch panel, a mouse, or the like while viewing the picture of the hands of the user displayed on fourth display panel 54. At this time, fourth camera 64 images the vicinity of the hands of the operator. In addition, the picture of the vicinity of the hands of the operator, which is imaged by fourth camera 64, is projected onto second display panel 22 of information displaying terminal 10. It is possible for the user to view the picture of the vicinity the hands of the operator, which is projected onto second display panel 22, while viewing a figure in which the operator gazes below and which is projected onto first display panel 21. Therefore, the user gets an impression in which the operator performs an operation before user's eyes during the conversation, and thus it is possible to provide an answer which brims with the sense of realism.

First Modification Example

FIG. 7A and FIG. 7B are diagrams illustrating an appearance of information displaying terminal 10A according to a first modification example. FIG. 7A is an appearance diagram of information displaying terminal 10A, which is viewed from a front direction, according to the first modification example. FIG. 7B is an appearance diagram of information displaying terminal 10A, which is viewed from a lateral direction, according to the first modification example. Compared to information displaying terminal 10 according to the exemplary embodiment, information displaying terminal 10A includes an integrated slim housing 212 which has a short depth, a narrow width, and a height that is approximately equal to a height of human (life size). At a center of a front surface of housing 212, monitor stand 213 is provided to extend to the front side from housing 212. In addition, first display panel 21A is disposed on a front surface of an upper part (in the drawing, an upper part than monitor stand 213) of housing 212. The facial picture of the operator imaged by third camera 63 is displayed on first display panel 21A.

In addition, interphone 25z is disposed on a side of first display panel 21A instead of the speaker and the microphone. In addition, second camera 32A, which images the hands of the user, and first camera 31A, which images the facial picture of the user, are disposed at the top and the bottom of first display panel 21A, respectively, as in the first exemplary embodiment.

In addition, hood 214 is provided to extend from both side parts of housing 212 at a lower part of monitor stand 213. Printer slot 40z, through which printed paper is discharged, is provided at a lower part of monitor stand 213. In addition, it is possible for the user to easily store baggage or the like in a space which is the lower part of monitor stand 213 and is surrounded by hood 214.

As described above, since information displaying terminal 10A according to the first modification example has the life size, it is possible for the user to face the facial picture of the operator, which is projected onto first display panel 21A, while standing. Therefore, it is possible for the user to communicate with the operator with further natural gaze. In addition, it is possible to use a space provided at the lower part of monitor stand 213 as an easy storage in which it is possible to temporarily put luggage or the like, thereby improving convenience.

Second Modification Example

FIG. 8A and FIG. 8B are diagrams illustrating an appearance of information displaying terminal 10B according to a second modification example. FIG. 8A is a perspective diagram illustrating the appearance of information displaying terminal 10B according to the second modification example. FIG. 8B is a diagram of information displaying terminal 10B, which is viewed from the lateral side, according to the second modification example.

Information displaying terminal 10B has housing 212B, which has a further shorter depth and which is slim, compared to information displaying terminal 10A according to the first modification example. In addition, an inverted V-shaped base member 215, which supports housing 212B such that housing 212B does not fall down, is provided at a lower end part of housing 212B.

Furthermore, housing 212B is inclined by a prescribed angle to lean on a rear side with respect to a vertical direction. Therefore, a display surface of first display panel 21B faces slightly upward, thereby facing the face of the operator. Therefore, visibility of the user is improved.

In addition, an operational surface of monitor stand 213B is inclined to a lower side by the prescribed angle (for example, 15°) with respect to the horizontal direction. Therefore, the operational surface of second display panel 22B is widely viewed to the user on the front side, and thus it is easy to perform an operation of the hands. Accordingly, usability of the user is improved.

Third Modification Example

FIG. 9A and FIG. 9B are perspective diagrams illustrating appearances of information displaying terminals 10C and 10D, which have different sizes, according to a third modification example. FIG. 9A is a perspective diagram illustrating the appearance of information displaying terminal 10C, which has a normal size, according to the third modification example. Information displaying terminal 10C has a size which is approximately the same as that of information displaying terminal 10A according to the first modification example, and has monitor stand 213C, which is inclined by the prescribed angle on the front side, unlike information displaying terminal 10A. Accordingly, it is easy for the user to perform an operation on an operational surface of second display panel 22C while standing up in a case where the user is talking while viewing the face of the operator displayed on first display panel 21C.

FIG. 9B is an appearance diagram illustrating information displaying terminal 10D, which has a small size and is viewed from a front direction, according to the third modification example. Compared to information displaying terminal 10D, which has the normal size, information displaying terminal 10D has low height, and thus it is easy for the gaze of the operator to match that of a child or a user in a wheelchair. Accordingly, usability of the child and the user in the wheelchair is improved.

As described above, information displaying system 5 according to the exemplary embodiment is an information displaying system, in which information displaying terminal 10, which can be operated by the user, is connected to information providing terminal 50, which can be operated by the operator, such that communication is possible. Information displaying terminal 10 includes first camera 31 which captures the image of the face of the user, second camera 32 which captures the image of the hands of the user, communication controller 20 (first communicator) which transmits data relevant to the image of the face of the user and the image of the hands of the user to information providing terminal 50 and receives the image of the face and at least the part of the upper body of the operator and the image of the hands of the operator that are transmitted from information providing terminal 50, first display panel 21 which displays the image of the face and at least the part of the upper body of the operator, and second display panel 22 which displays the image of the hands of the operator. Information providing terminal 50 includes third camera 63 which images the face and at least the part of the upper body of the operator, fourth camera 64 which images the hands of the operator, communication controller 60 (second communicator) which transmits data relevant to the image of the face and at least the part of the upper body of the operator and the image of the hands of the operator to information displaying terminal 10 and receives the image of the face of the user and the image of the hands of the user that are transmitted from information displaying terminal 10, third display panel 53 that displays the image of the face of the user, and fourth display panel 54 that displays the image of the hands of the user. Half mirror 75 (reflection section), which reflects pieces of display content of third display panel 53 toward the operator and causes incident light of third camera 63 to pass therethrough, is obliquely attached to the upper part of fourth display panel 54 by 45° (prescribed angle) with respect to the horizontal direction. Third camera 63 is disposed behind half mirror 75.

In information displaying system 5, the operator has a conversation with the user while viewing the facial picture of the user which is projected by third display panel 53 and is projected onto half mirror 75. Third camera 63 disposed at the back of half mirror 75 images the facial picture of the operator from the front over half mirror 75. At this time, the facial picture of the operator, which faces the front, is projected onto first display panel 21 of information displaying terminal 10. Therefore, in information displaying system 5, it is possible to save a space of the installation device in disposition of the operator-side terminal and to perform communication with the user with a natural gaze.

In addition, third display panel 53 is disposed at an upper part than fourth display panel 54, and half mirror 75 is disposed between third display panel 53 and fourth display panel 54. Therefore, it is possible to effectively utilize the upper part of the inner side of support stand 112, to which third display panel 53 is attached, without making the upper part be empty as the useless space. Therefore, it is possible to reduce the length of support stand 112 in the depth direction, and it is possible to make support stand 112 be compact.

In addition, half mirror 75 is attached such that the optical axis of third camera 63 passes through a central part of half mirror 75. Therefore, in a case where the image from third display panel 53 is projected onto the center of half mirror 75, third camera 63 images the facial picture of the operator such that the gaze of the operator faces the front. Therefore, it is possible for the user to talk with the operator who is displayed on first display panel 21 and has an expression which is viewed right in front.

In addition, half mirror 75 is attached such that the optical axis of third camera 63 passes through an upper end part of half mirror 75. Therefore, in a case where the image from third display panel 53 is projected onto the center of half mirror 75, third camera 63 images the facial picture of the operator such that the gaze of the operator faces slightly downward. Therefore, it is possible for the user to talk with the operator who is displayed on first display panel 21 and has the expression slightly looking down.

In addition, half mirror 75 is attached such that the optical axis of third camera 63 passes through a lower end part of half mirror 75. Therefore, in a case where the image from third display panel 53 is projected onto the center of half mirror 75, third camera 63 images the facial picture of the operator such that the gaze of the operator faces slightly upward. Therefore, it is possible for the user to talk with the operator who is displayed on first display panel 21 and has the expression slightly looking up.

Details and Task of Second Exemplary Embodiment

Furthermore, in order to make the user brim with the sense of realism, it is necessary to accurately and rapidly send information to the user, and it is desired to improve usability for the operator in such a way that the camera which images the face and the hands of the operator and the operator-side monitor on which the face and the hands of the user are displayed are provided.

Here, in a case where the camera which images the face and the hands of the operator and the operator-side monitor on which the face and the hands of the user are displayed are used, it is possible to provide the sense of realism in which the user actually faces the communication partner, and thus it is desired to enable the usability for the operator to be improved.

Second Exemplary Embodiment

An information displaying system according to a second exemplary embodiment has approximately the same configuration as in the first exemplary embodiment. The same symbols are used for the same components as in the first exemplary embodiment, and the description thereof will not be repeated.

FIG. 10 is a block diagram illustrating an example of an inside configuration of information displaying terminal 10 and information providing terminal 50A according to the second exemplary embodiment. Information providing terminal 50A according to the second exemplary embodiment includes display switching remote controller 85 and remote controller receiver 83, which performs wireless connection with remote controller 85, in addition to information providing terminal 50 according to the first exemplary embodiment.

In addition, controller 51A in information providing terminal 50A includes display switching controller 51z which switches between pieces of display content on third display panel 53 and fourth display panel 54 according to an instruction which is received by remote controller receiver 83 from remote controller 85 or according to selection of switching menu 122 (refer to FIG. 11) displayed on fourth display panel 54.

A display switching operation in information displaying system 5A which has the above configuration will be described.

Figure 11:
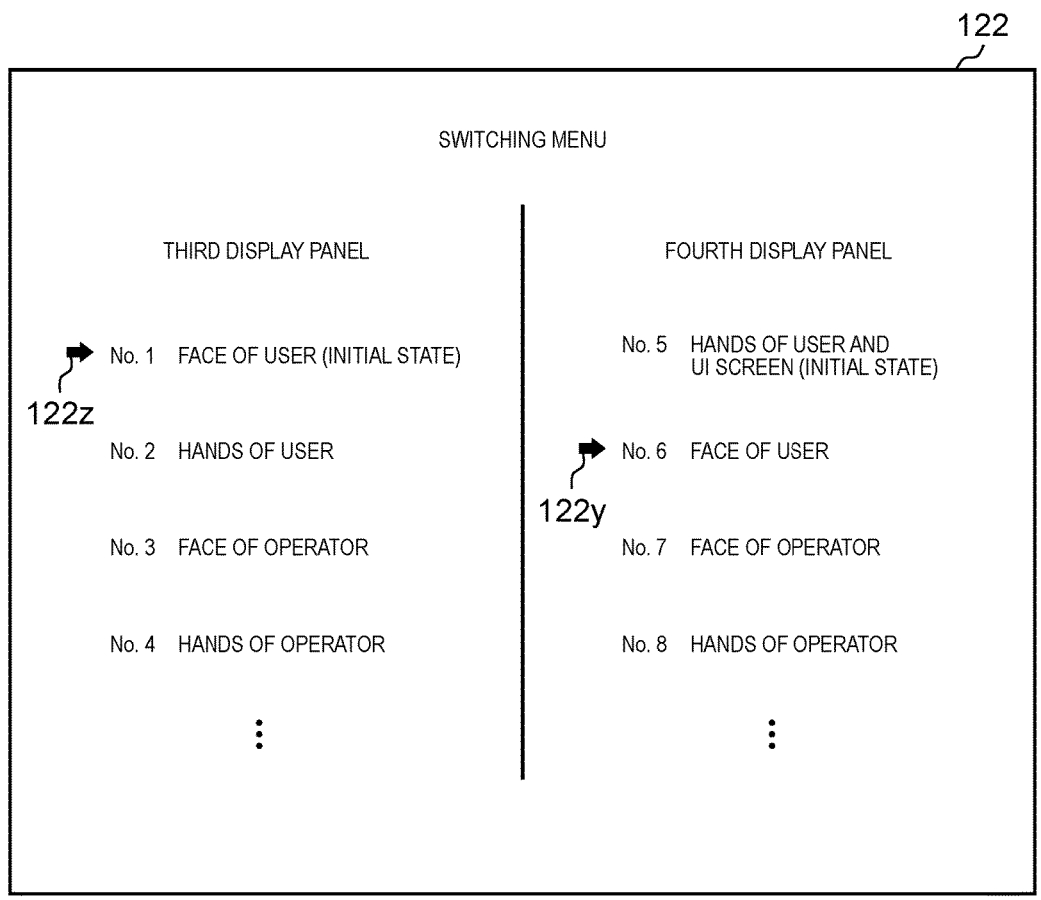
FIG. 11 is a diagram illustrating an example of a switching menu which is displayed on a fourth display panel.

FIG. 11 is a diagram illustrating switching menu 122 which is displayed on fourth display panel 54. A UI screen, which enables the touch operation, is displayed on fourth display panel 54. As a part of the UI screen, switching menu 122, in which it is possible to switch between the pieces of display content displayed on third display panel 53 and fourth display panel 54, is displayed on fourth display panel 54.

A list of display items of third display panel 53 and fourth display panel 54 is selectably displayed in switching menu 122. As the display items of third display panel 53, No. 1 the face of the user (initial state),
No. 2 the hands of the user,
No. 3 the face of the operator,
No. 4 the hands of the operator, and the like are selectable. As the display items of fourth display panel 54, No. 5 the hands of the user and the UI screen (initial state),
No. 6 the face of the user,
No. 7 the face of the operator,
No. 8 the hands of the operator, and the like are selectable.

Normally, an operation of fixing the display items of any one of third display panel 53 and fourth display panel 54 to the initial state and selecting or changing the display items of the other display panel is performed. However, an operation of selecting or changing the display items of both the display panels may be performed.

In a case where fourth display panel 54 includes a touch panel, the operator is capable of selecting any one of the display items of switching menu 122 and switching between the pieces of display content by directly performing the touch operation on fourth display panel 54. In addition, the operator may select a desired display item by operating marker 122z or 122y of switching menu 122 up and down using remote controller 85. In addition, the operator may switch into a desired display item by directly designating, for example, a number without using switching menu 122.

Subsequently, a use case acquired in a case where the pieces of display content of third display panel 53 and fourth display panel 54 are switched will be described. Normally, in the initial state, first camera 31 on a side of information displaying terminal 10 images the face of the user (customer). Second camera 32 on the side of information displaying terminal 10 images the hands of the user. In contrast, third camera 63 on a side of information providing terminal 50A images the face of the operator. Fourth camera 64 on the side of information providing terminal 50A images the hands of the operator.

In addition, third display panel 53 on the side of information providing terminal 50A is a small-sized monitor, and normally displays the facial picture of the user in the initial state. Fourth display panel 54 on the side of information providing terminal 50A is a large-sized monitor, and normally displays the picture of the hands of the user and the User Interface (UI) screen in the initial state.

Figure 12A:
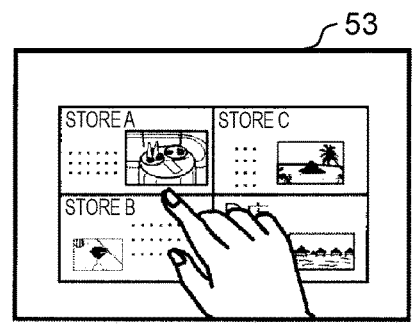
FIG. 12A is a diagram illustrating an example of a display screen of a third display panel in each use case.
Figure 12B:
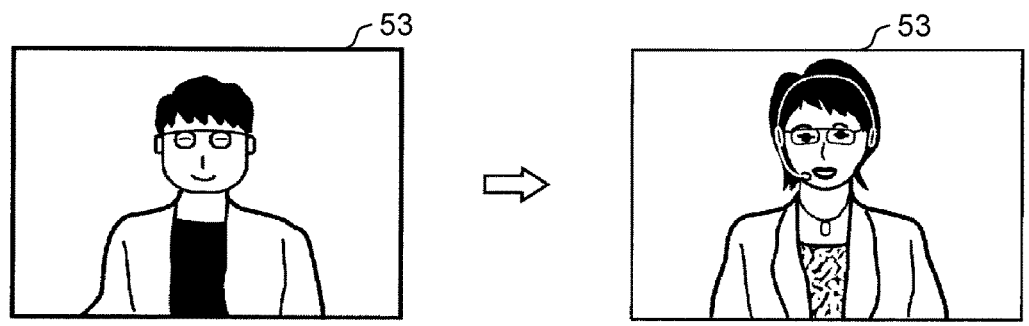
FIG. 12B is a diagram illustrating an example of the display screen of the third display panel in each use case.
Figure 12C:
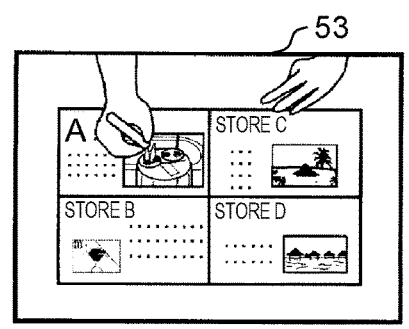
FIG. 12C is a diagram illustrating an example of the display screen of the third display panel in each use case.

FIG. 12A, FIG. 12B, and FIG. 12C are diagrams illustrating the display screens of third display panel 53 in respective use cases. As described above, third display panel 53 on the side of information providing terminal 50A normally displays the facial picture of the user.

In a first use case, third display panel 53 displays the picture of the hands of the user imaged by second camera 32 on the side of information displaying terminal 10. In this case, the operator operates the UI screen displayed on fourth display panel 54.

Specifically, a situation as illustrated in FIG. 12A is assumed. In a case where the user (customer) brings paper media, such as a shop map, a leaflet, and a pamphlet, spreads the paper media around the hands, and inquires of the operator about the paper media, second camera 32 images the paper media. The operator operates the UI screen of fourth display panel 54 while checking information of the paper media displayed on third display panel 53, searches for relevant information, such as existence or non-existence of a stock, a shop, or the like, and provides a suitable reply to the user.

In a second use case, third display panel 53 displays the facial picture (including the upper body) of the operator imaged by third camera 63 on the side of information providing terminal 50A. The operator adjusts focus alignment, zooming-in/out, or the like of third camera 63 while viewing the facial picture of the operator which is displayed on third display panel 53.

Specifically, there is a case where a focus of the image of the operator captured by third camera 63 is minutely deviated according to a build, a way of sitting, or the like of the operator. In a case where initial setting is performed on information displaying system 5 or the like, the operator appropriately changes setting of third camera 63 while checking a way that the facial picture of the operator is viewed for the user (customer) through third display panel 53.

As illustrated in FIG. 12B, normally, third display panel 53 displays the face of the user, and the operator talks with the user while viewing third display panel 53. Therefore, it is possible for the operator to check the image of the operator in a state as it is without changing the gaze even in a case where the facial picture of the operator imaged by third camera 63 is switched. Accordingly, in a case where the operator adjusts third camera 63 while viewing third display panel 53, it is possible for the operator to easily check the image of the operator which is actually viewed to the user. Therefore, it is possible to easily adjust third camera 63.

In a third use case, as illustrated in FIG. 12C, third display panel 53 displays the picture of the hands of the operator imaged by fourth camera 64. The operator adjusts the focus alignment, the zooming-in/out, or the like of fourth camera 64 while viewing the picture of the hands of the operator displayed on third display panel 53.

In a case where initial setting is performed on information displaying system 5 or the like, the operator performs focus alignment on fourth camera 64. In a case where the operator talks with the user (customer) and third display panel 53 displays the map or the leaflet as the picture of the hands of the operator, fourth camera 64 is caused to perform enlargement through optical zooming-in/out, and thus the map or the leaflet, which is difficult to be viewed on third display panel 53, becomes clear. Therefore, it is possible for the user to check contents of the map or the leaflet. Meanwhile, after the operator causes fourth camera 64 to perform enlargement, the operator may return setting of a location (coordinates) of fourth camera 64 or the like to a previously stored preset value (initial position).

Figure 13A:
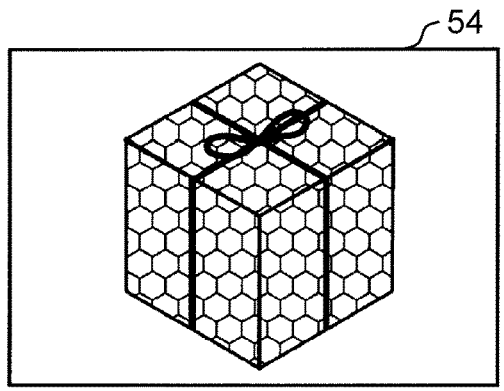
FIG. 13A is a diagram illustrating an example of a display screen of a fourth display panel in each use case.
Figure 13B:
FIG. 13B is a diagram illustrating an example of the display screen of the fourth display panel in each use case.
Figure 13C:
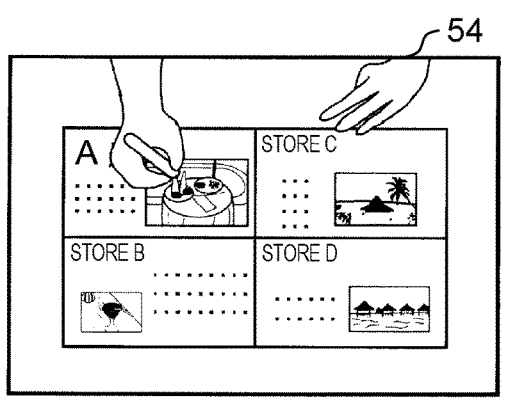
FIG. 13C is a diagram illustrating an example of the display screen of the fourth display panel in each use case.

FIG. 13A, FIG. 13B, and FIG. 13C are diagrams illustrating display screens of fourth display panel 54 in respective use cases. As described above, normally, fourth display panel 54 displays the picture of the hands of the user and the UI screen. Meanwhile, in a case where the UI screen exists in the vicinity of the hands in addition to the hands, the picture of the hands includes the UI screen.

In a fourth use case, fourth display panel 54 displays the picture of the hands of the user. Normally, third display panel 53 displays the facial picture of the user imaged by first camera 31. However, in a case where it is difficult to check contents in a range corresponding to the facial picture in the image which is captured by second camera 32, fourth display panel 54 takes action against the case.

Specifically, in a case where a product, which is brought by the user, is small or is too large, there is a case where it is difficult for the operator to correctly check contents of the product in the picture of the hands of the user which is imaged by second camera 32 installed at the upper part of information displaying terminal 10. Here, in a case where the operator performs an instruction with respect to first camera 31, which is installed at a lower part of information displaying terminal 10, using sounds or the like such that the user performs imaging by approaching or keeping away from the product, it is possible for the operator to check the contents of the product, which is imaged by first camera 31 and is displayed by fourth display panel 54, as illustrated in FIG. 13A.

In a fifth use case, as illustrated in FIG. 13B, fourth display panel 54 displays the facial picture of the operator (including the upper body) imaged by third camera 63. The operator talks with the user while checking a way that the facial picture of the operator is viewed to the user (customer).

In a sixth use case, as illustrated in FIG. 13C, fourth display panel 54 displays the picture of the hands of the operator imaged by fourth camera 64. The operator talks with the user while checking a way that the picture of the hands of the operator is viewed to the user. In this case, similar to the third use case, the operator adjusts the focus adjustment, the zooming-in/out, or the like of fourth camera 64. Meanwhile, fourth display panel 54 may simultaneously display the picture of the hands of the operator and the UI screen. In a case where the picture of the hands of the operator and the UI screen are simultaneously displayed, it is possible to display the picture of the hands of the operator as a picture-in-picture image in which the picture of the hands of the operator is displayed in a small window.

As described above, information displaying system 5A according to the second exemplary embodiment is an information displaying system in which information displaying terminal 10 which can be operated by the user is connected to information providing terminal 50A which can be operated by the operator such that communication is possible. Information displaying terminal 10 includes first camera 31 which captures the image of the face of the user, second camera 32 which captures the image of the hands of the user, communication controller 20 (first communicator) which transmits the data relevant to the image of the face of the user and the image of the hands of the user to information providing terminal 50A and receives the image of the face and at least the part of the upper body of the operator and the image of the hands of the operator that are transmitted from information providing terminal 50A, first display panel 21 which displays the image of the face and at least the part of the upper body of the operator, and second display panel 22 which displays the image of the hands of the operator. Information providing terminal 50A includes third camera 63 which images the face and at least the part of the upper body of the operator, fourth camera 64 which images the hands of the operator, communication controller 60 (second communicator) which transmits the data relevant to the image of the face and at least the part of the upper body of the operator and the image of the hands of the operator to information displaying terminal 10 and receives the image of the face of the user and the image of the hands of the user that are transmitted from information displaying terminal 10, third display panel 53 that displays the image of the face of the user, and fourth display panel 54 that displays the image of the hands of the user. Display switching controller 51z (switching processor) instructs to switch between the pieces of display content of third display panel 53 from the image of the face of the user captured by first camera 31 to the image captured by any one of second camera 32, third camera 63, and fourth camera 64.

As described above, in a case where the camera, which images the face and the hands of the operator or the user, and the operator-side display panel, on which the face and the hands of the user is displayed, are used, it is possible to switch between the pieces of display content of the third display panel from an image of the face of the user to another captured image. Accordingly, it is possible to provide the sense of realism in which the user actually faces the communication partner, and it is possible to improve the usability of the operator.

In addition, display switching controller 51z instructs to switch between the pieces of display content of fourth display panel 54 from the image of the hands of the user captured by second camera 32 to an image captured by any one of first camera 31, third camera 63, and fourth camera 64. Therefore, it is possible to switch between the pieces of display content of fourth display panel from the picture of the hands of the user to another imaged image, and thus it is possible to improve the usability of the operator.

In addition, information displaying system 5 includes display switching remote controller 85. Display switching controller 51z instructs to perform switching through an operation of remote controller 85. As described above, in a case where the remote controller is used, it is possible to simply instruct to perform switching. In addition, even in a case where a person who possesses the remote controller is in a location separated from the information providing terminal, it is possible to instruct to switch between the pieces of display content. Furthermore, even in a case where the operator does not know the switch between the pieces of display content, it is possible to instruct to switch between the pieces of display content, instead.

In addition, fourth display panel 54 displays switching menu 122. Display switching controller 51z instructs to perform switching through an operation with respect to switching menu 122. Therefore, it is possible for the operator to simply instruct to perform switching while viewing fourth display panel.

As above, various exemplary embodiments are described with reference to the drawings. However, the present disclosure is not limited to the examples. It is apparent that those skilled in the art understand that various modification examples or changed examples are conceivable in a category disclosed in claims and the modification examples or the changed examples are included in a technical scope of the present disclosure.

For example, in the second exemplary embodiment, a case where the information displaying terminal communicates with the information providing terminal one to one in the information displaying system is illustrated. However, it is also possible to apply a case where communication is performed through multipoint connection, such as 1 to N, N to 1, or N to N (N: plural number), to the present disclosure. In addition, in the case where communication is performed through the multipoint connection, the first display panel to the fourth display panel may display facial pictures or the pictures of the hands imaged by cameras in plural terminals through multi-screen display or screen switching display. Furthermore, the first display panel to fourth display panel may be capable of displaying plural pieces of terminal information altogether.

In addition, in the second exemplary embodiment, in a case where the pieces of display content of third display panel 53 and the pieces of display content of fourth display panel 54 are switched, it is possible to fix the pieces of display content of one of third display panel 53 and fourth display panel 54 and to randomly switch the pieces of display content of the other display panel. However, the pieces of display content of both third display panel 53 and fourth display panel 54 may be simultaneously switched. In a case where the pieces of display content of both third display panel 53 and fourth display panel 54 are simultaneously switched, a combination of the pieces of display content may be previously registered according to the use cases.

In addition, in the second exemplary embodiment, the information providing terminal may be configured such that the operator directly views the fourth display panel without using the prompter system, that is, without passing through the half mirror.

In addition, in each of the exemplary embodiment, in a case where the information displaying terminal projects the image of the face and at least the part of the upper body of the operator, a chest part is projected as at least a part of the upper body which is felt most naturally. However, an elbow part or a lumbar part may be projected. In addition, a head part or only a face may be projected without projecting the upper body. In addition, it is desired that the face and a part of the upper body, which are projected onto the display panel, are projected to coincide with actual sizes, thereby providing further natural feeling. In addition, in a case where the information displaying terminal includes a life-sized display panel, a whole body of the operator may be projected. In this case, the operator may have a standing posture or a sitting posture similar to the user.

INDUSTRIAL APPLICABILITY

The information displaying system and the information providing terminal according to the present disclosure are useful as an information displaying system and an information providing terminal which save a space of an installment device in disposition of the operator-side terminal and which are capable of performing communication with the user with natural gaze.

REFERENCE MARKS IN THE DRAWINGS

5 INFORMATION DISPLAYING SYSTEM
10, 10A, 10B, 10C, 10D INFORMATION DISPLAYING TERMINAL
11, 51 CONTROLLER
12 STAND
15 FIRST HOUSING
15z MIDDLE PART
18 SECOND HOUSING
18z FRONT END SURFACE
20, 60 COMMUNICATION CONTROLLER
21, 21A, 21B, 21C FIRST DISPLAY PANEL
22, 22B SECOND DISPLAY PANEL
25L, 25R SPEAKER
25z INTERPHONE
27 MICROPHONE
31 FIRST CAMERA
32 SECOND CAMERA
40 PRINTER
40z PRINTER SLOT
42 READING DEVICE
50, 50A INFORMATION PROVIDING TERMINAL
51, 51A CONTROLLER
51z DISPLAY SWITCHING CONTROLLER
53 THIRD DISPLAY PANEL
54 FOURTH DISPLAY PANEL
57 BAR
63 THIRD CAMERA
64 FOURTH CAMERA
68 CONSOLE
69 SCANNER
73 HEADSET
75 HALF MIRROR
83 REMOTE CONTROLLER RECEIVER
85 REMOTE CONTROLLER
90 NETWORK
110 OPERATIONAL DESK
112 SUPPORT STAND
112w REAR SURFACE PLATE
112x SIDE PLATE
112y TOP PLATE
112z FRAME
122 SWITCHING MENU
122y, 122z MARKER
212, 212B HOUSING
213, 213B, 213C MONITOR STAND
214 HOOD
215 BASE MEMBER
op OPERATOR

The invention claimed is:

1. An information displaying system, in which an information displaying terminal that can be operated by a user is connected to an information providing terminal that can be operated by an operator such that communication is possible,
wherein the information displaying terminal includes:
a first camera that captures an image of a face of the user;
a second camera that captures an image of hands of the user;
a first communicator that transmits the image of the face of the user and the image of the hands of the user to the information providing terminal, and that receives an image of a face and at least a part of an upper body of the operator and an image of an upper surface of a desk which are transmitted from the information providing terminal, the image of the upper surface of the desk including hands of the operator;
a first display panel that displays the image of the face and at least the part of the upper body of the operator; and
a second display panel that displays the image of the hands of the operator,
wherein the second camera further captures the second display panel so that the image of the hands of the user captured by the second camera includes the second display panel, and
wherein the information providing terminal includes:
a third camera that captures the image of the face and at least the part of the upper body of the operator;
a fourth camera that captures the image of the upper surface of the desk, the image of the upper surface of the desk including the hands of the operator;
a second communicator that transmits the image of the face and at least the part of the upper body of the operator and the image of the upper surface of the desk to the information displaying terminal, the image of the upper surface of the desk including the hands of the operator, and receives the image of the face of the user and the image of the hands of the user which are transmitted from the information displaying terminal;
a third display panel that displays the image of the face of the user;
a fourth display panel that displays the image of the hands of the user; and
a switching processor that instructs to switch between pieces of display content of the third display panel from the image of the face of the user captured by the first camera to the image captured by any one of the second camera, the third camera, and the fourth camera.

2. The information displaying system of claim 1, wherein the switching processor instructs to switch between pieces of display content of the fourth display panel from the image of the hands of the user captured by the second camera to the image captured by any one of the first camera, the third camera, and the fourth camera.

3. The information displaying system of claim 1, further comprising:
a display switching remote controller,
wherein the switching processor instructs to perform the switching through an operation of the remote controller.

4. The information displaying system of claim 1,
wherein the fourth display panel displays a switching menu, and wherein the switching processor instructs to perform the switching through an operation with respect to the switching menu.

5. An information providing terminal, which is connected to information displaying terminal that can be operated by a user such that communication is possible and which can be operated by an operator, the information providing terminal comprising:
- a first camera that captures an image of a face and at least a part of an upper body of the operator;
- a second camera that captures an image of an upper surface of a desk, the image of the upper surface of the desk including hands of the operator;
- a communicator that transmits the image of the face and at least the part of the upper body of the operator and the image of the upper surface of the desk to the information displaying terminal, the image of the upper surface of the desk including the hands of the operator, and receives an image of a face of the user and an image of hands of the user which are transmitted from the information displaying terminal, the image of the hands of the user including a third display panel included in the information displaying terminal, the third display panel displaying the image of the upper surface of the desk, the image of the upper surface of the desk including the hands of the operator;
- a first display panel that displays the image of the face of the user;
- a second display panel that displays the image of the hands of the user; and
- a switching processor that instructs to switch between pieces of display content of the first display panel from the image of the face of the user captured by the first camera to any one of the image of the hands of the user, the image captured by the first camera, and the image captured by the second camera.

* * * * *